United States Patent
Mai

(10) Patent No.: US 11,349,639 B2
(45) Date of Patent: May 31, 2022

(54) CIRCUIT AND METHOD FOR OVERCOMING MEMORY BOTTLENECK OF ASIC-RESISTANT CRYPTOGRAPHIC ALGORITHMS

(71) Applicant: ePIC Blockchain Technologies Inc., Toronto (CA)

(72) Inventor: Toan-Earl Mai, Stouffville (CA)

(73) Assignee: ePIC Blockchain Technologies Inc., Toronto (CA)

( * ) Notice: Subject to any disclaimer, the term of this patent is extended or adjusted under 35 U.S.C. 154(b) by 485 days.

(21) Appl. No.: 16/235,734

(22) Filed: Dec. 28, 2018

(65) Prior Publication Data

US 2020/0213091 A1     Jul. 2, 2020

(51) Int. Cl.
- *H04L 9/06*        (2006.01)
- *G06F 16/901*      (2019.01)
- *G06F 12/14*       (2006.01)
- *H04L 9/14*        (2006.01)

(52) U.S. Cl.
CPC ........ *H04L 9/0643* (2013.01); *G06F 12/1408* (2013.01); *G06F 16/9024* (2019.01); *H04L 9/14* (2013.01); *G06F 2212/1052* (2013.01); *H04L 2209/12* (2013.01)

(58) Field of Classification Search
CPC ..... H04L 9/0643; H04L 9/14; H04L 2209/12; G06F 16/9024
USPC ....................................................... 713/193
See application file for complete search history.

(56) References Cited

U.S. PATENT DOCUMENTS

| | | | |
|---|---|---|---|
| 10,635,824 B1* | 4/2020 | Triandopoulos | G06F 21/6245 |
| 10,873,458 B2* | 12/2020 | Reinhold | H04L 9/3234 |
| 2014/0201851 A1* | 7/2014 | Guo | G06F 1/26 726/34 |
| 2014/0223192 A1* | 8/2014 | Dent | G06F 21/64 713/189 |
| 2014/0310536 A1* | 10/2014 | Shacham | G06F 3/0658 713/193 |
| 2015/0070979 A1* | 3/2015 | Zhu | G11C 11/1695 365/158 |
| 2015/0074433 A1* | 3/2015 | Zhu | G11C 11/1695 713/300 |
| 2015/0095662 A1* | 4/2015 | Jejurikar | G06F 12/14 713/193 |
| 2015/0199266 A1* | 7/2015 | Franchetti | G06F 15/7821 711/117 |

(Continued)

OTHER PUBLICATIONS

Yitaifang, "Ethash Algorithm Analysis", Jul. 25, 2018, "https://zhuanlan.zhihu.eom/p/40573223" (Year: 2018).*

(Continued)

*Primary Examiner* — Venkat Perungavoor
*Assistant Examiner* — Peiliang Pan
(74) *Attorney, Agent, or Firm* — Ridout & Maybee LLP

(57) ABSTRACT

An application-specific integrated circuit (ASIC) and method are provided for executing a memory-hard algorithm requiring reading generated data. A processor or state machine executes one or more steps of the memory-hard algorithm and requests the generated data. At least one specialized circuit is provided for generating the generated data on demand in response to a request for the generated data from the processor. Specific embodiments are applied to memory-hard cryptographic algorithms, including Ethash and Equihash.

9 Claims, 10 Drawing Sheets

(56) References Cited

U.S. PATENT DOCUMENTS

| | | | |
|---|---|---|---|
| 2015/0261965 A1* | 9/2015 | Brumley | G09C 1/00 |
| | | | 713/193 |
| 2016/0105285 A1* | 4/2016 | Jakobsson | H04L 9/3231 |
| | | | 713/186 |
| 2016/0269392 A1* | 9/2016 | Arumugam | H04L 63/083 |
| 2016/0342977 A1* | 11/2016 | Lam | G06Q 20/0658 |
| 2017/0212781 A1* | 7/2017 | Dillenberger | G06F 16/28 |
| 2017/0352027 A1* | 12/2017 | Zhang | G06Q 20/065 |
| 2018/0150654 A1* | 5/2018 | Connor | G09C 1/00 |
| 2018/0218005 A1* | 8/2018 | Kuhtz | G06F 16/1752 |
| 2019/0129893 A1* | 5/2019 | Baird, III | G06F 16/90335 |
| 2020/0264921 A1* | 8/2020 | Luo | G06F 9/4881 |
| 2021/0124818 A1* | 4/2021 | Muthu | H04L 9/0894 |

OTHER PUBLICATIONS

Biryukov et al., "Equihash: asymmetric proof-of-work based on the Generalized Birthday problem", Feb. 2016, Proceedings of NDSS 2016.
Aumasson, et al., "BLAKE2: simpler, smaller, fast as MD5", Jan. 29, 2013.
Wagner D., "A Generalized Birthday Problem" In: Yung M. (eds) Advances in Cryptology—Crypto 2002. Lecture Notes in Computer Science, vol. 2442. Springer, Berlin, Heidelberg (2002).
Ray J., (2018) Dagger Hashimoto. https://github.com/ethereum/wiki/wiki/Dagger-Hashimoto.

* cited by examiner

CIRCUIT AND METHOD FOR OVERCOMING MEMORY BOTTLENECK OF ASIC-RESISTANT CRYPTOGRAPHIC ALGORITHMS

FIELD

The present disclosure relates to application-specific integrated circuits (ASICs) for executing cryptographic algorithms. In particular, the present disclosure relates to devices for overcoming memory bottlenecks created by cryptographic algorithms that are designed to be resistant to execution by ASICs.

BACKGROUND

There have been efforts in the fields of cryptography and cryptocurrency to create cryptographic algorithms that are specifically tailored to being resistant to solution by an ASIC (Application Specific Integrated Circuit). The purpose of these algorithms is to create an even playing field for everyone so that no one can gain a large advantage in processing power beyond what is commercially available, i.e. using commodity general-purpose computing hardware. This is of particular interest and importance for decentralized peer-to-peer networks, such as cryptocurrency networks. This leads to the use of Graphical Processing Units (GPUs) being the main source of processing which is readily available as an end consumer product.

One approach used by ASIC resistant algorithms is to design the algorithm to be memory hard or memory bound. This means that access to memory by the processor (such as a CPU, GPU, or other processing circuit such as an ASIC) becomes the limiting factor in improving the performance of the algorithm. Because commercial memory, such as Double Data Rate/Graphics Double Data Rate Synchronous Dynamic Random-Access Memory (DDR/GDDR SDRAM) is equally available to all consumers, the result is that everyone can have equal access to the best processing power for these ASIC resistant algorithms. In theory, this limits the performance of any single user in a network to the speed of access to commodity memory. The number of processors (e.g. CPUs, GPUs, or ASICS) running the algorithm on the network, not the power of those processors, becomes an upper limit on the performance and cost-effectiveness of the network as a whole.

There thus exists a need to overcome the memory bottleneck created by ASIC-resistant cryptographic algorithms.

SUMMARY

The present disclosure describes example circuits for overcoming the memory bottleneck of ASIC-resistant cryptographic algorithms. The dependency on memory is removed altogether to overcome memory bound accesses. In place of memory, the logic necessary to generate the required data can be built into the ASIC itself. Instead of reading a memory to obtain stored data as in a conventional execution of the algorithm, the ASIC can generate the data that the processor would need to read from memory and provide it to the processor.

According to some aspects, the present disclosure describes an application-specific integrated circuit (ASIC) for executing a memory-hard algorithm requiring reading generated data. The ASIC comprises a processor for executing one or more steps of the memory-hard algorithm and requesting the generated data, and at least one specialized circuit for generating the generated data on demand in response to a request for the generated data from the processor.

According to a further aspect which can be combined with other embodiments disclosed herein, the algorithm is a cryptographic algorithm.

According to a further aspect which can be combined with other embodiments disclosed herein, the algorithm is Ethash.

According to a further aspect which can be combined with other embodiments disclosed herein, the at least one specialized circuit comprises at least one Secure Hash Algorithm 3 (SHA3) core, the generated data comprises directed acyclic graph (DAG) data, and the request for the generated data comprises a request from the processor to fetch a DAG page.

According to a further aspect which can be combined with other embodiments disclosed herein, the at least one SHA3 core is configured to execute the SHA3-256 hash function, the Fowler-Noll-Vo (FNV) hash function, and the RandMemoHash hash function to generate the DAG data.

According to a further aspect which can be combined with other embodiments disclosed herein, the algorithm is Equihash.

According to a further aspect which can be combined with other embodiments disclosed herein, the at least one specialized circuit comprises at least one Blake2B core, and the generated data comprises Blake2B hash data.

According to a further aspect which can be combined with other embodiments disclosed herein, the generated data further comprises string data generated from the Blake2B data, and XOR data generated by performing XOR operations on the string data. The request for the generated data comprises a request from the processor to read one or more of the Blake2B data, the string data, and the XOR data.

According to a further aspect which can be combined with other embodiments disclosed herein, the ASIC further comprises an on-chip memory, wherein the processor is configured to identify collisions between matching pairs records of the XOR data and store pointers to matching pairs in the on-chip memory.

According to a further aspect which can be combined with other embodiments disclosed herein, the ASIC further comprises an external memory, wherein the processor is configured to store the XOR data in the external memory and request the XOR data from the external memory.

According to a further aspect which can be combined with other embodiments disclosed herein, the processor is further configured to sort the XOR data prior to identifying collisions.

According to a further aspect which can be combined with other embodiments disclosed herein, the cryptographic algorithm is Scrypt.

According to a further aspect which can be combined with other embodiments disclosed herein, the cryptographic algorithm is CryptoNight.

According to a further aspect which can be combined with other embodiments disclosed herein, the at least one specialized circuit comprises a plurality of specialized circuits operating in parallel.

According to a further aspect which can be combined with other embodiments disclosed herein, the processor is configured to execute multiple processes of the memory-hard algorithm in parallel.

According to a further aspect which can be combined with other embodiments disclosed herein, the processor comprises multiple processing cores.

According to a further aspect which can be combined with other embodiments disclosed herein, the memory hard algorithm is an algorithm that requires reading the generated data repeatedly.

According to a further aspect which can be combined with other embodiments disclosed herein, the memory hard algorithm is an algorithm that requires reading the generated data randomly.

According to a further aspect which can be combined with other embodiments disclosed herein, the present disclosure describes a method of executing a memory-hard algorithm requiring reading generated data, comprising executing one or more steps of the memory-hard algorithm and requesting the generated data using a state machine, and generating the generated data on demand using one or more specialized circuits in response to a request for the generated data from the processor.

According to a further aspect which can be combined with other embodiments disclosed herein, the algorithm is a cryptographic algorithm.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
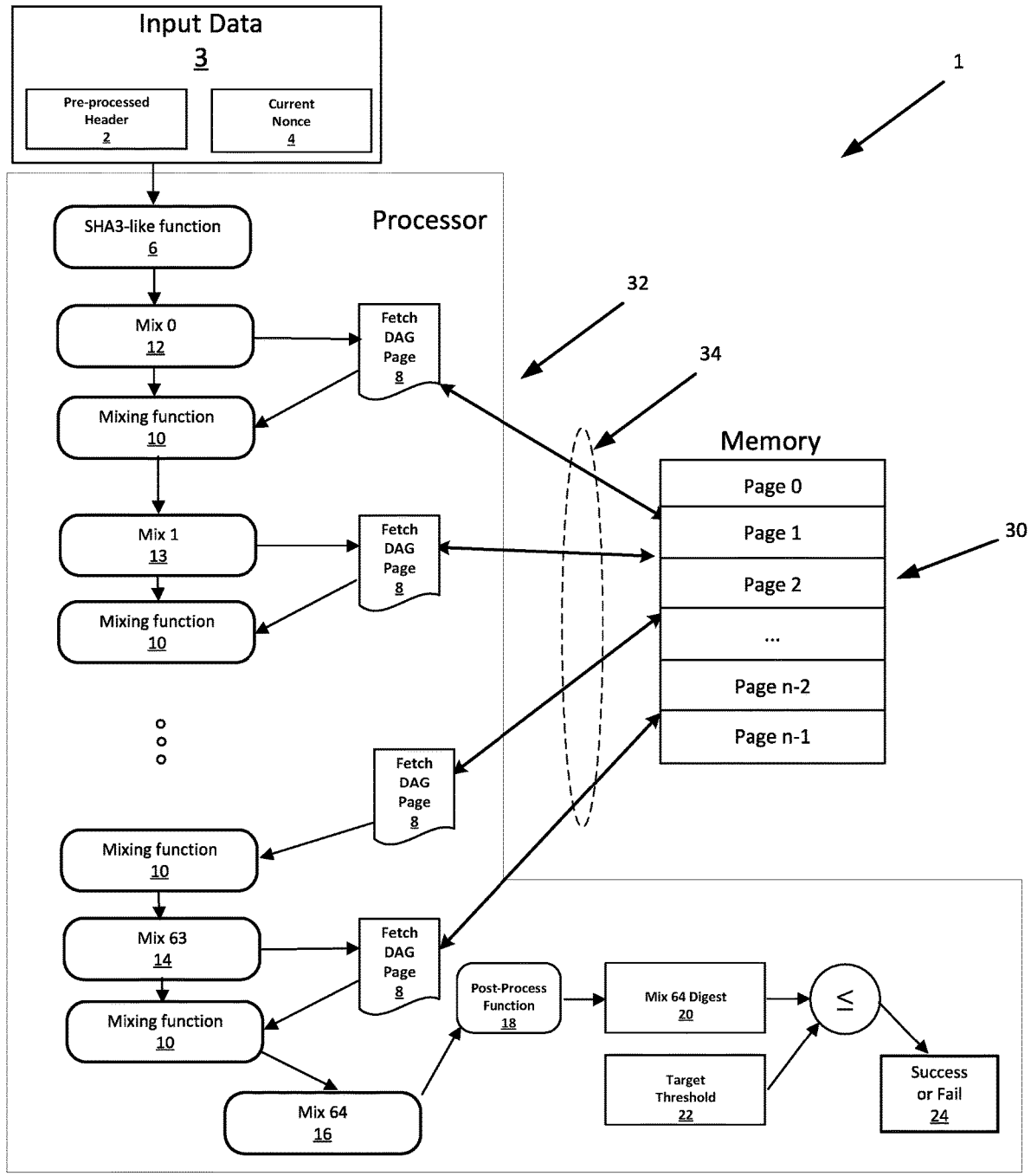
FIG. 1A is a block diagram showing an example method for executing the Ethash algorithm using a conventional computer.

The present disclosure describes example devices for executing memory-hard algorithms, and in particular memory-hard cryptographic algorithms. The described examples overcome the memory bottleneck created by ASIC-resistant cryptographic algorithms by replacing the memory with a circuit that generates on demand the data that would otherwise be retrieved from memory.

Cryptographic algorithms may use many methods in attempt to be ASIC resistant, but most such methods fit into two distinct types. The first method is to require reading datasets repeatedly, while the second method attempts to read data randomly, thereby causing storage of large datasets into memory. Both methods are bound by how fast a system can read sequential access memory (SAM) or read random access memory (RAM).

The examples described herein can potentially increase the performance of a system in executing either type of ASIC-resistant algorithm. Described examples may also reduce the overall power of the system by removing the requirement for external memory altogether. Rather than generating data, storing it in memory, and then accessing that stored data, the examples described below may operate by generating the data on demand.

Instead of a traditional processor-memory configuration with the processor connected to memory by a memory bus, the described examples replace the memory with a specialized circuit configured to generate cryptographic data on demand. Both processor and specialized circuit are built into a single integrated circuit (ASIC), such as a microchip. Memory requests are sent out by the processor as usual, but instead of going to a traditional memory, the results are generated using the specialized circuit on the ASIC itself. This method can be expanded to have several instances or slices of the same specialized circuit to support more memory requests in parallel, thus increasing the overall system bandwidth.

Examples of ASIC-resistant cryptographic algorithms to which the described techniques may be applied include Ethash, Equihash, Scrypt, and CryptoNight.

Ethash, previously called Dagger-Hashimoto, is the proof-of-work function in Ethereum-based blockchain currencies. It is designed to be memory-hard and thereby exhibit ASIC resistance.

The Ethash algorithm requires generating a large data set—currently 4 gigabytes (GB)—and then accessing 64 elements from the dataset randomly. The large data set and 64 random accesses to memory make this problem very suitable for GPUs but very wasteful for a specialized ASIC application.

Equihash is another memory-bound proof-of-work algorithm designed to be resistant to execution by special-purpose ASICs. It is used by the ZCash cryptocurrency. It is described in the paper by A. Biryukov and D. Khovratovich, "Equihash: asymmetric proof-of-work based on the Generalized Birthday problem", February 2016, Proceedings of NDSS 2016, available at (http://orbilu.uni.lu/bitstream/10993/22277/2/946.pdf).

Equihash generates a dataset using the Blake2b algorithm and requires nine stages of repeated reading to solve a generalized birthday problem, as described in the Biryukov and Khovratovich paper cited above. This sequential reading of memory is what makes the algorithm memory bound. The Blake2B hash function is described at (https://blake2.net/blake2.pdf) and would be understood by the skilled person.

Scrypt is a memory-intensive hash function designed to reduce the efficiency of logic circuits and thereby achieve ASIC resistance.

Cryptonight is another ASIC resistant cryptographic algorithm used for blockchain proof-of-work. It relies on random access to the slow memory and emphasizes latency dependence. Each new block in the blockchain depends on all the previous blocks, unlike some other algorithms such as Scrypt.

ASIC-resistant cryptographic algorithms are often deployed in the context of proof-of-work cryptocurrency mining. In proof-of-work mining, the goal for which a miner is rewarded is to generate a short binary blob (i.e. a non-human-readable data block) called a nonce. The nonce has a hash function applied to it, with the goal of producing an output value (i.e. a hashed nonce) with a value below a specified upper bound or target threshold. The hash functions used for this purpose are cryptographic hash functions: this prevents reverse-computation of a nonce that will satisfy the target threshold requirement. Thus, miners must engage in trial and error by performing "guess-and-check" hashes as fast as possible. The first miner in the mining network to find a valid nonce is rewarded with a unit of cryptocurrency.

With reference to the figures, the operation of a conventional computer engaged in cryptocurrency mining will now be described to provide a reference for the novel methods and devices described herein. FIG. 1A shows a flowchart of an example method 1 for mining the Ethereum cryptocurrency using the Ethash hashing algorithm on a general-purpose computer comprising a processor 32, such as a CPU or GPU, and a memory 30, such as RAM, in communication with the processor 32 over a memory bus. The purpose of this method 1, as stated above, is to determine whether an example nonce 4 (i.e. a guess by the miner as to a valid nonce value), when hashed, generates a hashed value less than the upper bound or target threshold 22. Once the miner finds a valid nonce value 4 that meets this criterion, the nonce value 4 can be broadcast to the network, granting the miner a unit of Ethereum once the miner's work has been validated by others on the network.

The Ethash hashing algorithm makes use of a randomly- or pseudo-randomly-generated data set, called a DAG. Ordinarily, the DAG data set is only generated once per "epoch" (30,000 blocks in the blockchain, or 100 hours). The generation of the DAG takes a significant amount of time. The size of the DAG is determined based on the current length of the blockchain being processed by the network.

The Ethash algorithm begins with the receipt of input data 3 by the processor 32. The input data 3 comprises a pre-processed header 2, which is based on the latest block in the blockchain, and the current nonce 4, i.e. the current guess for a nonce value being tested by the miner. The pre-processed header 2 and the nonce 4 are combined using a SHA3-like function to create an initial 128-byte mix value, referred to as "Mix 0" 12 in FIG. 1A.

The processor 32 uses the "Mix 0" value 12 to compute which 128-byte page from the DAG to fetch from the memory 30, represented by a "Fetch DAG Page" block 8. The processor 32 then applies a mixing function 10 to combine the fetched DAG data with "Mix 0" to return a "Mix 1" value 13. In the context of Ethereum mining, the mixing function 10 is specific to Ethereum.

The steps of fetching a DAG page 8 and applying the mixing function 10 to produce a further Mix value are repeated a total of 64 times to arrive at a "Mix 64" value. Each time, the current Mix value is used to determine which DAG page to fetch from the memory 30. In Ethereum mining, the DAG pages stored in memory and retrieved by the Ethash algorithm at the "Fetch DAG Page" block 8 are each 128 bytes in length.

The "Mix 64" value 16 has a Post-Process Function 18 applied to it to produce a "Mix 64 Digest" value 20, which is 32 bytes in length instead of 128 bytes in the context of Ethereum mining. This shorter "Mix 63 Digest" value 20 is then compared to the Target Threshold 22. If "Mix 643 Digest" 16 is equal to or lower than the target threshold 22, a valid nonce value 4 has been found, and the miner can submit the nonce value 4 to the Ethereum network to be rewarded with a unit of Ethereum currency. If the value of "Mix 64 Digest" 16 is greater than the target threshold 22, then the nonce value 4 is deemed invalid and the method 1 is repeated using a new nonce value 4. Some implementations may pick a new nonce value 4 by incrementing the last attempted nonce value 4, while others may pick a new nonce value 4 at random.

The memory hardness of this method 1 is a result of the memory bottleneck 34 created by the communication of the processor 32 with the memory 30 via a memory bus. Every time the mixing function 10 is applied, the algorithm requires that the "Fetch DAG Page" block 8 is run to fetch a 128-byte page from the memory 30. A single application of the method 1 to hash a single nonce 4 therefore requires 64 mixes, at 128 bytes of memory read each time, for a total of approximately 8 kilobytes of memory reads. These memory reads are random access reads: each DAG page is chosen pseudorandomly or unpredictably based on the mixing function 10. This lack of predictability in the memory page read locations limits the potential efficiency gains from using a memory cache, such as an L1 or L2 cache, to store a small portion of the very large DAG dataset, as subsequent reads are unlikely to be proximate in memory location to previous reads. In conventional computers, fetching a page from the memory 30 is generally much slower than the time required for the processor 32 to apply the mixing function 10, so increases in the speed of the processor 32 are unlikely to result in any performance gains, as the memory bottleneck 34 acts as an overall bottleneck in executing the method 1. Thus, the bandwidth of the memory fetching operation is the limiting factor in the performance of the hashing method 1.

A typical commercially available graphics card provides a baseline against which to measure the performance of hardware used in Ethereum mining. An example mid-range graphics card available on the market in 2018 may cost approximately $150 and have a memory bandwidth of 200 Gigabytes per second. This bandwidth yields a hash rate of (200 Gb/s)/(8 Kb/hash)=25,000 hashes per second. At a price of $150, this means that the cost of this hash throughput is 166.67 hashes per second per dollar. The power consumption of the graphics card is another factor to consider in the economic efficiency of using the example graphics card as part of an Ethereum mining system relative to some other hardware configuration.

Figure 1B:
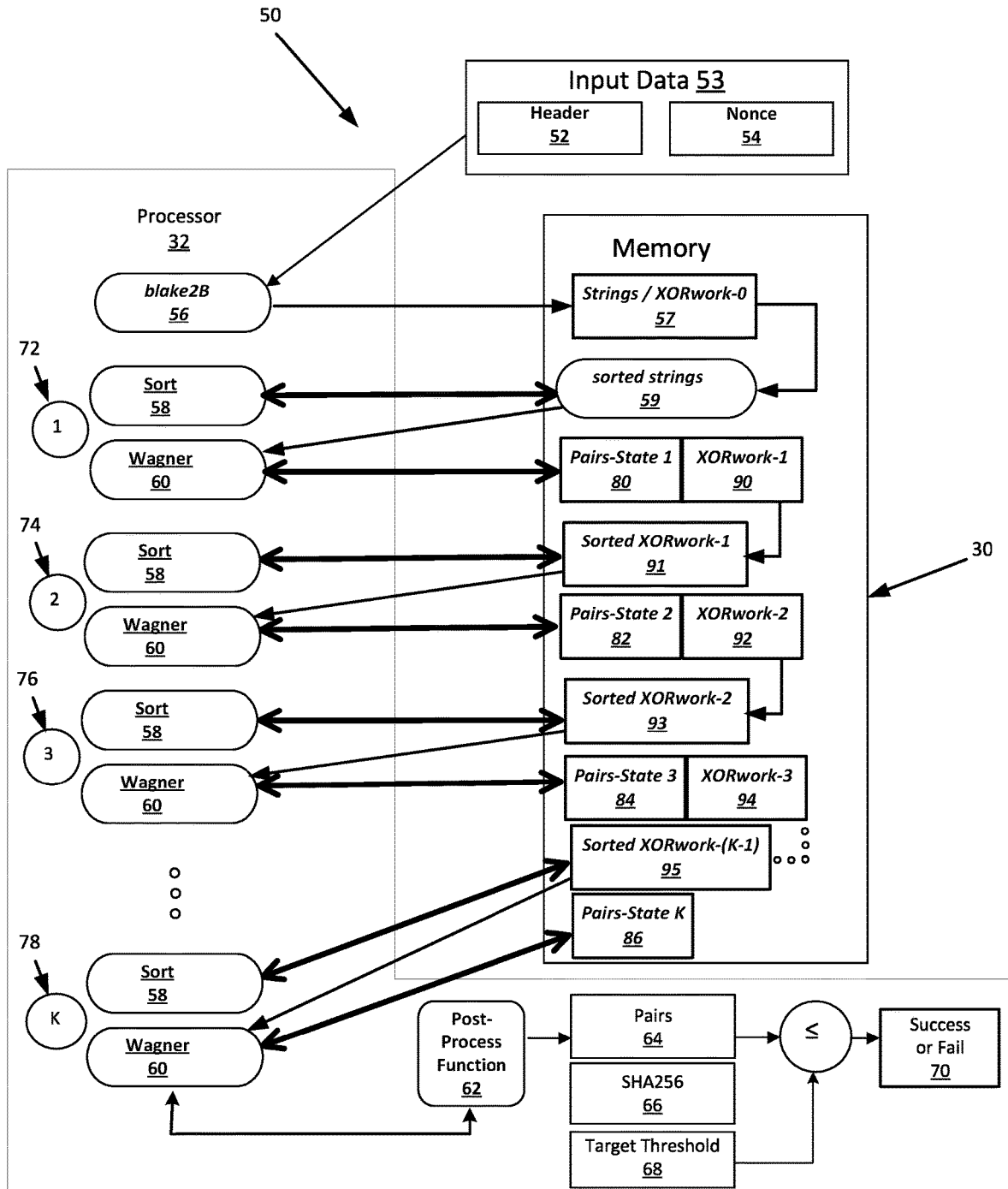
FIG. 1B is a block diagram showing an example method for executing the Equihash algorithm using a conventional computer.

A flowchart of a second example cryptocurrency mining method 50 is shown in FIG. 1B. This method 50 executes the Equihash hashing algorithm on a general-purpose computer comprising a processor 32, such as a CPU or GPU, and a memory 30, such as RAM, in communication with the processor 32 over a memory bus. As in the Ethash mining method 1 of FIG. 1A, the purpose of this Equihash mining method 50 is to determine whether an example nonce 54 (i.e. a guess by the miner as to a valid nonce value), when hashed, generates a hashed value less than the upper bound or target threshold 68. Once the miner finds a valid nonce value 54 that meets this criterion, the nonce value 54 can be broadcast to the ZCash network, granting the miner a unit of the ZCash cryptocurrency once the miner's work has been validated by others on the network.

Equihash is an asymmetric proof-of-work algorithm based on a computationally hard generalized birthday problem. Equihash is memory hard insofar as it requires a large memory to generate a proof, but verification is fast.

Equihash has two parameters: N (width in bits of each hash string) and K (number of iterations=length of binary tree). These two parameters determine the complexity of the underlying problem and thus the memory and time requirements of the proof of work process. The hash function used by Equihash in the described examples is Blake2b.

The time complexity of Equihash is proportional to: $K \times 2^{(N/(K+1))}$. The memory complexity is proportional to $2^{(K+N/(K+1))}$. Verification requires $2^K$ hashes and XOR functions. The illustrated example in FIG. 1B uses values of K=9 and N=200, which are typical values used in a ZCash-mining implementation of Equihash.

The illustrated Equihash mining method 50 begins with the receipt by the processor 32 of input data 53 comprising header information 52 from the current block of the blockchain and a 32-byte nonce value 54 chosen by the miner for testing.

The processor 32 applies the Blake2B hash function 56 to the nonce 54 and header 52 (appended with a hash index value) to generate a large number of hashes: $2^{20}$, or 1,048,576 hashes in total. Each hash is N/4 bytes in length (50 bytes in our example). Each hash is split into two strings of equal size, resulting in $2^{(N/K+1)+1}$ strings. In our example, with N=200 and K=9, this results in $2^{21}$ or 2,097,152 strings of 25 bytes (N=200 bits) each. These strings 57 are stored in the memory 30, typically in a data structure such as an array, ordinarily requiring at least 50 megabytes of memory. This high memory requirement is generally effective to render FPGA (field programmable gate array) or ASIC (application specific integrated circuit) implementations of this algorithm infeasible, as that volume of memory is generally prohibitive as to cost, size and power consumption when implemented on-chip within an FPGA or ASIC.

The processor 32 then proceeds to solve K (K=9 in our example) iterations of a two-part process: a sorting step 58 followed by an execution of Wagner's algorithm 60. The sorting step 58, which may be omitted in some implementations, involves sorting the 2,097,152 strings 57 by value using a conventional sorting algorithm. This sorting step 58 facilitates the execution of Wagner's algorithm 60, which is described below.

Wagner's algorithm ultimately attempts to identify $2^K$ (512 in our example) different strings from the stored set of 2,097,152 strings 57 having a set of specific properties. These properties are as follows: first, the binary XOR (exclusive OR) function applied to the 512 strings results in a value of zero. Second, on each split by two of your indexes, the left ones must be ordered. Third, on each split by two of your indexes, the resulting XOR of strings must have (20×height) zero bits from the left.

The binary XOR function will be appreciated by the skilled person to be defined as follows when applied to two bit values: 1 XOR 1=0, 0 XOR 1=1, 1 XOR 0=1, 0 XOR 0=0. Thus, when applied to two bits strings of length twenty, XOR returns a string of twenty "zero" bit values only if the values of the two strings are identical.

Each of the (K=9) iterations of the sorting step 58 and Wagner's algorithm 60 involves processing 20 additional bits ((N/(K+1))=(200/10)=20) from each of the 2,097,152 original strings of 25 bytes each (N=200 bits). The first iteration 72 processes the 20 left-most bits, i.e. bits 0 to 19. The second iteration 74 processes bits 0 to 39. The third iteration 76 involves processing bits 0 to 59, and so on, until the tenth (K+1th) iteration 78 involves processing all bits 0 to 199 of the strings 57. At each iteration, the bits being processed are referred to as the "interesting bits" or "bits of interest" for that iteration. Wagner's algorithm is searching for pairs of strings 57 whose bits of interest are identical.

To assist the execution of Wagner's algorithm 60, an example sorting step 58 may sort the strings 57 into 256 "buckets" or subsets based on the first 8 bits of interest. In one example implementation, during the first iteration 72, the sorting step 58 uses bits 0-7 of each string to categorize it into one of the 256 buckets, storing the categorized records in memory 30 in a data structure "sorted strings" 59. Wagner's algorithm 60 is then executed within each bucket to find matching pairs.

In place of a bucket sort algorithm, different sorting algorithms may be used in the sorting step 58 and may achieve different tradeoffs of processor cycles, memory usage, latency, and other resources depending on the parameter values used (e.g. K and N) and the hardware executing the algorithm 50. For example, a radix sort may be used in place of the bucket sort to achieve similar results to a bucket sort. Alternatively, in some examples a bubble sort or bitonic sort algorithm may be used instead. A bitonic sorting algorithm may exhibit advantages in a parallel architecture due to its parallel nature.

Thus, at each iteration (such as second iteration 74), Wagner's algorithm 60 attempts to combine pairs of strings 57 from the previous step (such as first iteration 72) and store index references to the pairs that have common interesting bits: it creates and stores an index of the pairs of strings 57 whose XOR with each other is zero at the bits of interest. This operation is sometimes called "collision". For example, if the strings 57 at index value 23 and index value 55 (out of a total of 2,097,152 possible index values) have the same bits at bit positions 0-19, the pair "23-55" will be stored as a matching pair in the memory 30 after the first iteration 72. The list of all matching pairs found by each iteration may be stored in the memory as an array or other appropriate data structure containing records of the index values of the matching pairs. In FIG. 1B, this data structure storing the list of matching pairs is represented as array Pairs. The first Pairs array generated by the first iteration 72 is labeled "Pairs-State 1" 80, the second Pairs array generated by the second iteration 74 is labelled "Pairs-State 2" 82, the third Pairs array generated by the third iteration 76 is labelled "Pairs-State 3" 84, and the Kth Pairs array generated by the Kth iteration 78 is labelled "Pairs-State K" 86. Each State value refers to the outcome of a corresponding iteration: i.e., "State 1" as used herein refers to the outcome (e.g. the values stored in the memory 30) of the first iteration 72.

Each iteration of Wagner's algorithm also performs an XOR operation on the remaining bits of each string (i.e., the bits that are not bits of interest for that iteration, such as bits 20 to 199 at the first iteration 72). The results of the XOR operation are stored in the memory 30 in an array or other suitable data structure called "XORwork". This XORwork array is overwritten after each iteration, with the records being truncated by 20 bits in length each time. The Strings array 57 can be considered to be the initial condition for the XORwork array prior to the first iteration 72, designated "XORwork-0". XORwork-0 contains 2,097,152 records, each being a string of length 200 bits. After the first iteration 72, the array is designated as "XORwork-1" 90 and contains 2,097,152 records, each 180 bits in length, corresponding to the product of an XOR operation on bits 20 to 199 of each similarly-indexed entry in the Pairs-State 1 80 array. Thus, if the first record (at index value 0) of the Pairs-State 1 array 72 is the pair "23-55", indicating that the first iteration 72 of Wagner's algorithm 60 detected a matching pair at index values 23 and 55 of the Strings array 57 (i.e. the strings at positions 23 and 55 in Strings 57 have identical bit values for bits 0 to 19), then the first record of the XORwork-1 array 90 will be a 180-bit-long string equal to the result of (Strings[23][bits 20-199]) XOR (Strings[55][bits 20-199]). At each subsequent iteration, Wagner's algorithm 60 performs this XOR operation using the XORwork values from the previous state as operands, and storing the results in a new XORwork array (i.e. XORwork-2 92 after the second iteration 74, XORwork-3 94 after the third iteration 76 and so on). The XORwork arrays from previous states may be discarded once the iteration of Wagner's algorithm 60 is complete.

When executed on the initial set of 2,097,152 strings 57, Wagner's algorithm is expected to result in approximately the same number of matched pairs, i.e. approximately 2 million matched pairs. The odds of any two strings 57 matching each other in a given 20-bit sequence is 1 out of ($2^{20}$=1,048,576=2,097,152/2), and the number of comparisons performed is roughly ($2,097,152^2/2$), so the expected number of matches is (($2,097,152^2/2$)/(2,097,152/2))=2,097,152. The length of the Pairs array 80,82,84, ... 86 will therefore tend to be roughly equal to the length of the strings array 57, or about 2 million items or records long.

After the first iteration 72, the steps proceed in a similar fashion. The sorting step 58 is applied, not to the Strings array 57, but to the XORwork array: thus, during the second iteration 74, the sorting step 58 sorts the strings stored in XORwork-1 90 to produce a sorted XORwork-1 array 91, and the third iteration 76 applies the sorting step 58 to XORwork-2 92 to produce sorted XORwork-2 93. The final Kth iteration 78 creates a sorted XORwork-(K−1) array 95 from the unsorted XORwork-(K−1) array (not shown) produced by Wagner's algorithm 60 during the (K−1)th iteration (not shown).

Similarly, the collision comparison carried out by Wagner's algorithm 60 in the second iteration 74 and subsequent iterations compares two existing matched pairs taken from the Pairs array from the previous State. Thus, if the first iteration 72 identified the strings at index values 23 and 55 of the Strings array 57 as matching (i.e. having identical bits 0 to 19), and also the strings at index values 34 and 87 as matching, the Pairs-State 1 array 80 would contain a first record of index values "23-55" and a second record of index values "34-87", indicating that both records 23 and 55 and records 34 and 87 of the Strings 57 array were found to match at bits 0 to 19. Thus, each item or record in the Pairs-State 1 array 80 is a pair of pointers to two items in the Strings array 57.

The second iteration 74 would then compare the first 20 bits of the 180-bit strings stored in the XORwork array from the previous state, namely XORwork-1 90. (Note that these first 20 bits in XORwork-1 90 correspond to the XOR results of bits 20 to 39 from the strings stored in the Strings array 57, as the first iteration 72 shortens each record by 20 bits of length as it processes another 20-bit portion of the strings.) Each match identified within XORwork-1 90 results in a record being stored in Pairs-State 2 82 pointing to the two matching records from XORwork-1 90.

Throughout these iterations, note that the index values of the XORwork and Pairs arrays have a 1:1 correspondence. A record at index i of Pairs-State 1 80 points to two matching records from Strings 57 whose remaining bits 20-199, when XOR-ed together, produce a 180-bit XOR string stored at index i of XORwork-1 90. Similarly, a record at index i of Pairs-State 2 82 points to two matching records from XORwork-1 90 whose remaining bits 40-199, when XOR-ed together, produce a 160-bit XOR string stored at index i of XORwork-2 92. This process continues until, at the Kth iteration 78, the collision comparison by Wagner's algorithm 60 produces Pairs-State K 86 containing roughly 2 million records, each of which indicates an identical 20-bit sequence in two records from the sorted XORwork-(K−1) array 95, whose records are each 40 bits long. The records in Pairs-State K 86 are pairs of pointers to two index values in Pairs-State (K−1) (not shown).

The 20-bit strings remaining after the Kth iteration 78 can then be compared with a straightforward comparison function.

The Pairs array from each state (i.e. Pairs-State 1 80 through Pairs-State K 86) is stored in the memory 30 until all iterations are complete. Thus, after each iteration 72,74, 76, . . . 78, the memory 30 will contain a growing binary tree of indexes to the original strings: Pairs-State K 86 contains pairs of pointers to Pairs-State (K−1) (not shown), and so on until Pairs-State 1 80 contains pairs of pointers to Strings 57. By traversing this binary tree backward starting from a single matching pair stored in Pairs-State K 86, a total of 512 records from Strings 57 are identified.

Note that all 512 indexes in one tree must be unique for that tree to yield a solution to the mining algorithm 50. A solution containing a duplicate (i.e. the same string appearing twice within a given binary tree of 512 strings) constitutes a trivial solution to the mining algorithm 50 and is not valid. In some implementations, duplicates may be detected during one or more of the iterations of the sorting step 58 and Wagner's algorithm 60, while in other implementations detection of duplicates is performed after all K iterations have been completed. For example, after the final Kth iteration 78, duplicates may be detected and removed by a cleanup function which traverses each binary tree and discards any tree containing duplicate strings from the Strings array 57. In other implementations, any XOR string consisting of all "zero" bit values may be discarded along with the corresponding Pairs-State record, because this XOR string and its corresponding Pairs almost certainly represent a trivial solution to the algorithm. The bucket-sorting implementation of the sorting step 58 may operate more efficiently if duplicates are detected and removed during the K iterations, such as during iterations 4 through 8—allowing the duplicates to remain in the Pairs array during these iterations may result in the sorting step 58 spending a great deal of time sorting duplicates into buckets, slowing down the overall mining algorithm 50.

A typical nonce value 54 will provide an average of two non-trivial solutions that meet the criteria of Wagner's algorithm 60. After the Kth iteration 78, the algorithm will thus have identified two different trees of 512 unique indexes to the array Strings 57 that can be combined to yield the desired properties of Wagner's algorithm 60 identified above.

Once the Kth iteration 78 has completed, for each potential solution identified (2 on average), the post-process function 62 fills the rest of block with the solution length (3 bytes) and the solution itself, which is encoded by 20 bits per index: this information is thus 20 bits×512 indices=1280 bytes long. Each 1280-byte candidate solution block so generated is stored in a final Pairs array 64. The post-processing function 62 then packs the data (header 52, nonce 54, and Pairs 64) with padding into a format for hashing by a SHA256 function 66 and comparison to a target threshold 68 as described below.

In the final step, as in the Ethash algorithm implementation 1 described above, the Equihash mining algorithm implementation 50 imposes a difficulty barrier in the form of a target threshold 58, which is a maximum length for the hash of the solution. A SHA256 hash function 66 is applied to each candidate solution block. The resulting hash value is compared to the target threshold 68. If the hash value is equal to or lower than the target threshold 68, this constitutes a valid solution; if it is above the target threshold 68, it fails the difficulty check and is invalid. At a success/failure step 70, valid solutions are propagated to the network for a cryptocurrency reward, while invalid solutions are discarded or reported to a mining poll as invalid. The mining algorithm 50 may then be restarted with a new nonce value 54.

Some implementations may optimize one or more of these steps by using multi-threading on multi-core CPUs or GPUs. For example, if the bucket-sorting algorithm described above is used as a sorting step 58 at each iteration, each bucket of strings can be separately and independently checked for collisions, and the matches XOR-ed together, by a separate processor core. However, the speed bottleneck in such optimized solutions will typically still reside at the point of memory access, as commercially-available RAM performs read and write operations slower than a processor core can complete the necessary operations.

Example ASICs are now described for overcoming the memory bottleneck created by ASIC-resistant algorithms such as Ethash. Specialized ASICs for executing the Ethash algorithm and the Equihash algorithm are described with reference to the drawings. However, the skilled person will appreciate that any ASIC-resistant, memory-hard or memory-bound algorithm, whether a cryptographic algorithm or not, could be subject to the described techniques for overcoming the memory bottleneck.

Figure 2A:
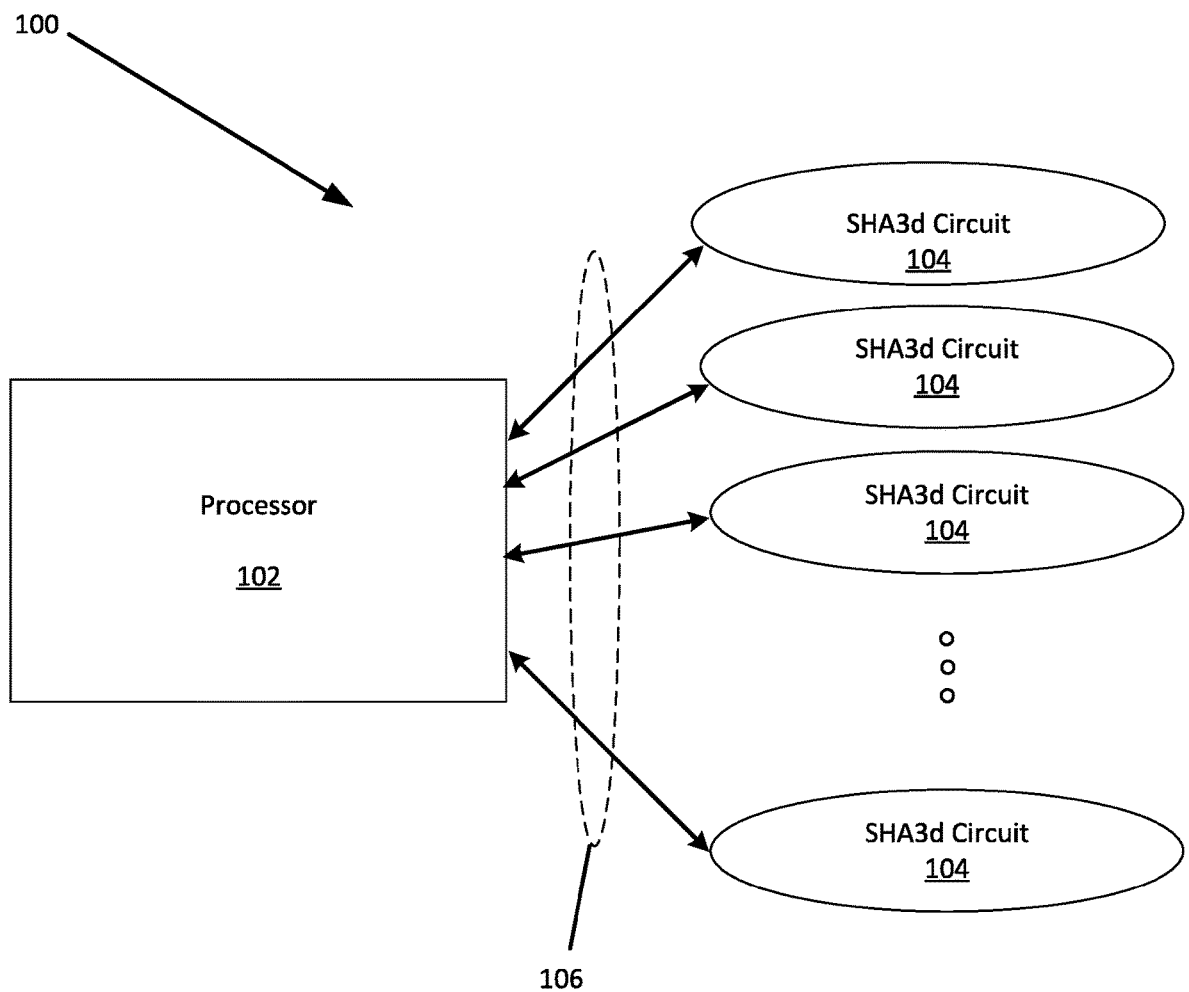
FIG. 2A is a block diagram showing an example circuit for executing the Ethash algorithm.

With reference to FIG. 2A, a basic block diagram of an Ethash ASIC 100 is shown. The Ethash ASIC 100 comprises a processor 102 in communication with a plurality of specialized SHA3d circuits 104 or cores via a circuit interface 106 such as an on-chip set of wires. The processor 102 may be any state machine: it may for example be a CPU, GPU, hardware accelerator, or portion of an integrated circuit capable of acting as a state machine and processing instructions. The processor 102 and specialized SHA3d circuits 104 are in described examples implemented within the same integrated circuit so as to minimize the latency introduced by a long memory bus between a conventional processor and an off-chip RAM module.

Even by using a single SHA3d digital circuit 104, an example Ethash ASIC 100 could generate the required reads necessary to satisfy the algorithm. However, the large 4 GB data set used by Ethash is based on a directed acyclic graph (DAG). Each element in the dataset is therefore based on the previous element. That means that, on average, the Ethash ASIC 100 would need to wait for the generation of half the 4 GB dataset to find each of the 64 random entries. Greater efficiency can be achieved by the use of multiple SHA3d digital circuits 104: for example, when using two SHA3d circuits 104, the Ethash ASIC 100 would only need to wait for the generation of one quarter of the DAG data set, on average, to read one of the 64 random entries.

Thus, as the number of specialized SHA3d circuits 104 increases, the speed continues to increase exponentially. Scaling this multi-core or multi-circuit approach and having multiple solution attempts proceeding in parallel leads to a far greater hash rate while not being bound by memory. Having an on-chip design reduces power while also increasing theoretical bandwidth to numbers that are not achievable with today's commercial memory.

Figure 2B:
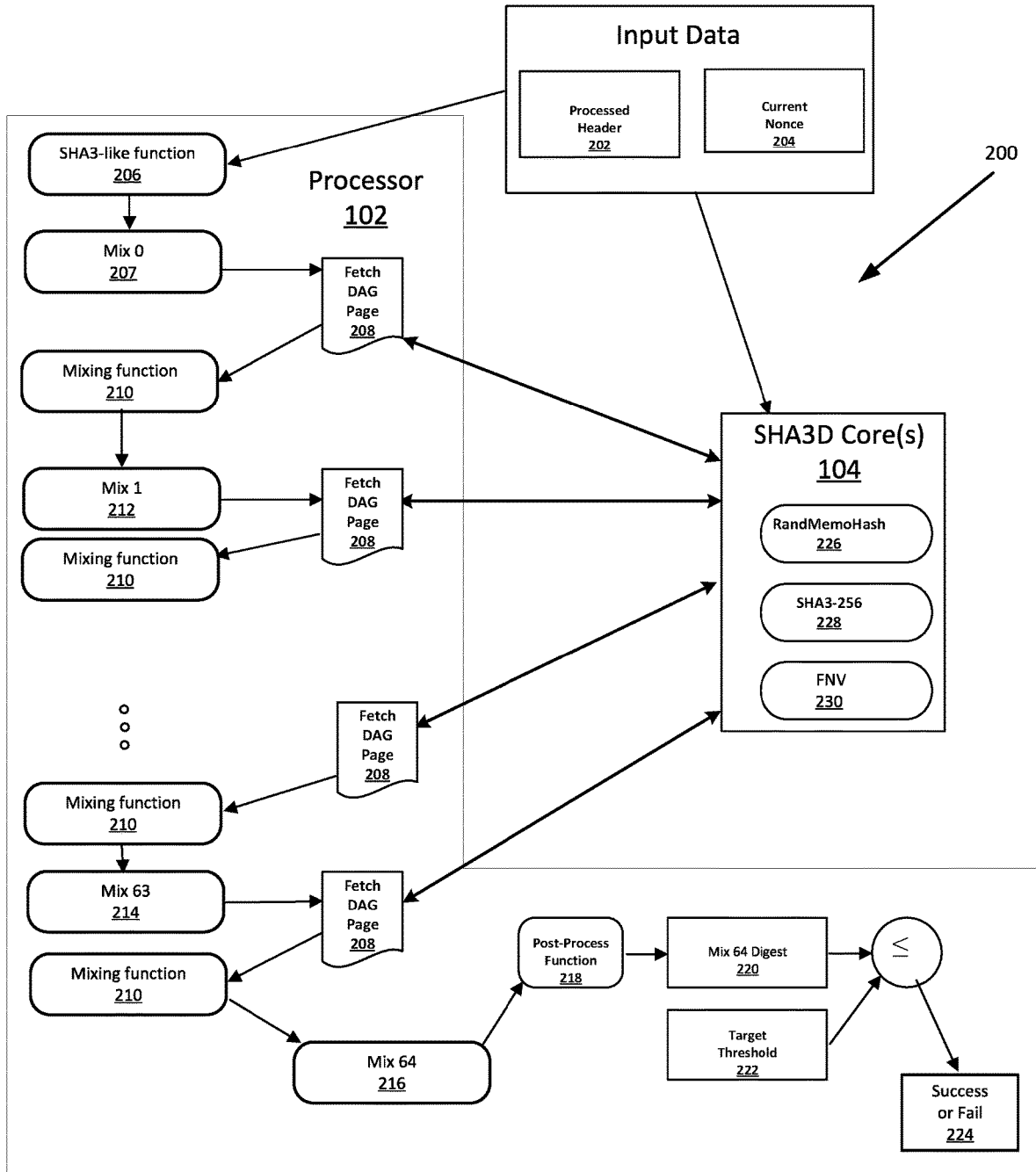
FIG. 2B is a flowchart showing an example method for executing the Ethash algorithm using the circuit of FIG. 2A.

FIG. 2B shows a flowchart of the execution of the Ethash algorithm by the processor 102. Ordinarily, in the Ethash algorithm, the DAG data set is only generate once per "epoch" (30,000 blocks in the blockchain, or 100 hours). The generation of the DAG takes a significant amount of time. In this flowchart, the specialized SHA3d circuits 104 are used to generate the DAG in parallel and to respond to memory requests for random DAG data entries (i.e., requests to fetch DAG pages from memory) as though the entries were being read from memory.

The illustrated method 200 for executing Ethash using the Ethash ASIC 100 begins, as in the conventional Ethash implementation 1, with receipt by the processor 102 of input data in the form of header data 202 and a cryptographic nonce 204 for the current block in the blockchain being processed. The header 202 and nonce 204 are also received by the one or more SHA3d cores 104, which generate the DAG data block using the RandMemoHash function 226, SHA3-256 (Secure Hash Algorithm 3, 256 bit digest) 228, and the Fowler-Noll-Vo (FNV) hash function 230.

The processor 102 then begins to execute the Ethash algorithm using the SHA3d cores 104 in place of a memory. The method 200 proceeds on the processor 102 in much the same way as in the conventional CPU-and-RAM Ethash implementation 1 from FIG. 1A at each stage. At step 206, a SHA3-like function (such as SHA3 or a similar hash function) is applied to the header data 202 and nonce value 204 to generate the "Mix 0" value 207.

The processor 32 uses the "Mix 0" value 207 to compute which 128-byte page from the DAG to fetch from the SHA3D core(s) 104, represented by a "Fetch DAG Page" block 208. The processor 102 then applies a mixing function 210 to combine the fetched DAG data with "Mix 0" to return a "Mix 1" value 212. In the context of Ethereum mining, the mixing function 210 is specific to Ethereum.

The steps of fetching a DAG page 208 and applying the mixing function 210 to produce a further Mix value are repeated a total of 64 times to arrive at a "Mix 64" value 216. Each time, the current Mix value is used to determine which DAG page to fetch from the SHA3D core(s) 104. In Ethereum mining, the DAG pages retrieved by the Ethash algorithm at the "Fetch DAG Page" block 8 are each 128 bytes in length.

The "Mix 64" value 216 has a Post-Process Function 218 applied to it to produce a "Mix 64 Digest" value 220, which is 32 bytes in length instead of 128 bytes in the context of Ethereum mining. This shorter "Mix 64 Digest" value 20 is then compared to the Target Threshold 222. If "Mix 64 Digest" 220 is equal to or lower than the target threshold 222, a valid nonce value 204 has been found, and the miner can submit the nonce value 204 to the Ethereum network to be rewarded with a unit of Ethereum currency. If the value of "Mix 64 Digest" 216 is greater than the target threshold 222, then the nonce value 204 is deemed invalid and the method 1 is repeated using a new nonce value 204. Some implementations may pick a new nonce value 204 by incrementing the last attempted nonce value 204, while others may pick a new nonce value 204 at random.

Unlike the conventional implementation using a CPU and RAM 1, this ASIC implementation 200 uses the one or more on-chip SHA3D cores 204 in place of an off-chip memory 30. When the Ethash algorithm calls for the first of the 64 memory calls to access a portion of the DAG data, the processor 102 executes a call to fetch a page of the DAG from memory at step 208. Instead of returning a stored DAG page from a memory, however, the ASIC 100 instead uses one or more of the SHA3d cores 104 to generate the DAG data on the fly using the three hash functions 226,228,230 described above. In cases where the processor 102 constitutes a multi-core processor or a processor capable of executing multiple parallel processes to test multiple candidate solutions in parallel, the use of multiple SHA3D cores 104 allows each process to potentially access a different SHA3D core 104, further alleviating the speed bottleneck in the conventional implementation 1 caused by the DAG data being stored in a single memory 30 that must be accessed by all processes.

Furthermore, by using multiple Blake2B cores 304, all XOR operations may be carried out in parallel by the Blake2B cores 304 during a given iteration, with each XOR result being processed by the processor 302 performing a simple 20-bit equality comparison. With a sufficient number of Blake2B cores 304, the bottleneck in each iteration becomes the processor 302 performing these simply 20-bit equality comparisons as fast as it can.

Figure 3A:
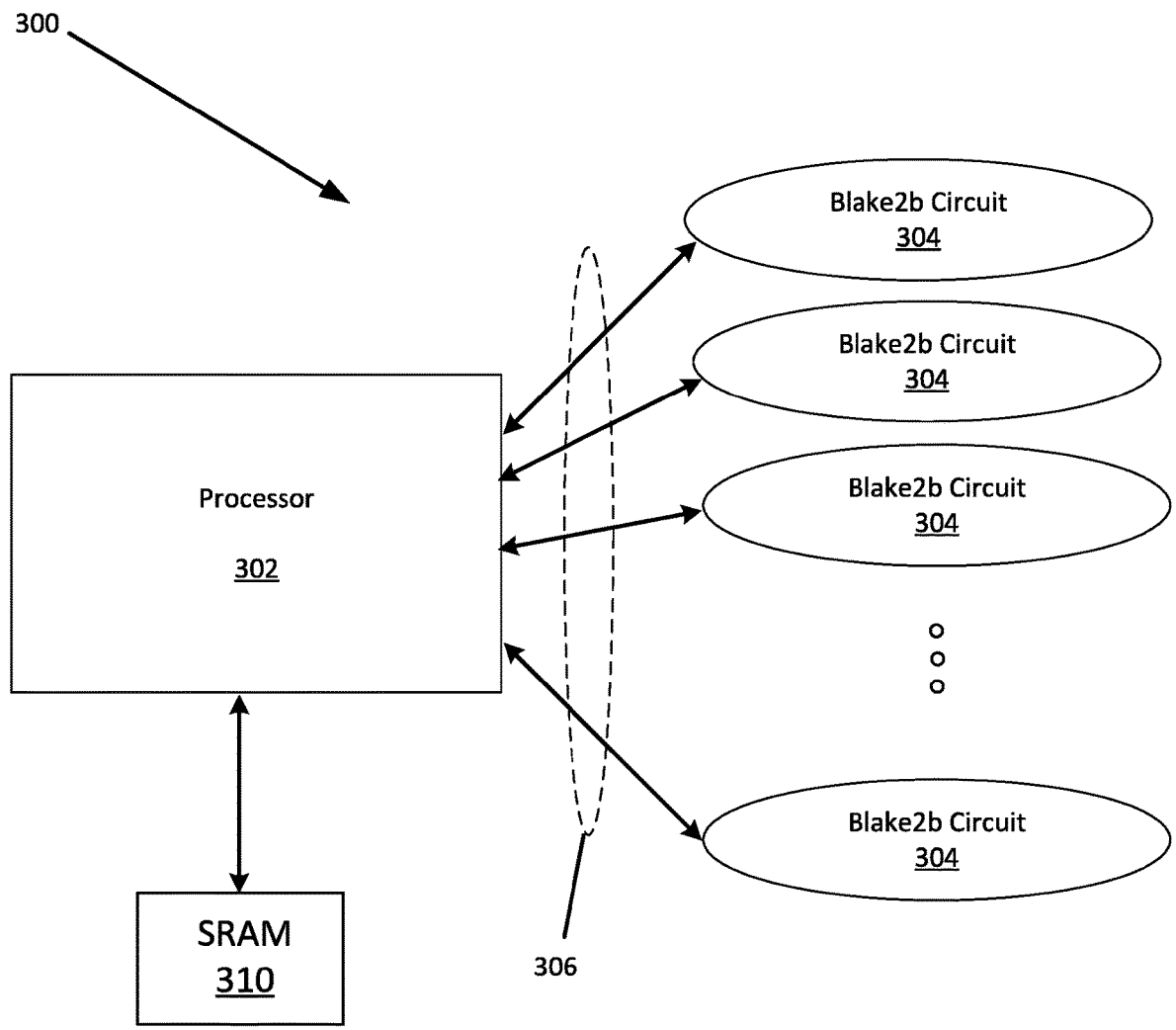
FIG. 3A is a block diagram showing an example circuit for executing the Equihash algorithm without the use of an external memory.

Other cryptographic algorithms may also be implemented in a similar fashion using a special-purpose ASIC. With reference to FIG. 3A, a basic block diagram of an Equihash ASIC 300 is shown. The Equihash ASIC 300 comprises a processor 302 in communication with a plurality of specialized Blake2b circuits 304 or cores via an on-chip circuit interface 306. The processor 302 also uses a relatively small on-chip memory 310, such as semiconductor-based SRAM (static random access memory) built into the ASIC 300, to store small data sets such as the Pairs arrays (Pairs-State 1 80, Pair-State 1 82, Pairs-State 2 84, through Pairs-State K 86), each of which consists only of pointers to string index values or array index values and is therefore small in size relative to the Strings 57 or XORwork arrays 90,92,94, 95. Reads and writes to this on-chip memory 310 are relatively fast, not only because on-chip memory accesses are faster than external memory (e.g. DRAM) accesses, but also because the data records being read are much smaller. Furthermore, Pairs data is only generated when a collision or match is detected, so these memory writes are relatively infrequent. Thus, the small datasets being read from and written to the on-chip memory 310 do not create a memory bottleneck, in contrast to the large XORwork datasets being read from and written to the external memory 30 of the conventional Equihash implementation 1.

By using one or more Blake2b digital circuits 304 incorporated into the ASIC itself, the Equihash ASIC 300 can generate the required index values on demand by incurring a small delay in a pipelined design. Furthermore, the Equihash algorithm requires sequential access, so every subsequent read can be pipelined, thus increasing the performance of the digital Blake2b circuits 304.

In one example, a single Blake2b circuit 304 running at 1 GHz could generate 200 Gbps of data for sequential reads. Multiplying these cores by 8 would output 200 GBps, which is comparable to the speed of contemporary GDDR5 SDRAM. The architecture of this Equihash ASIC 300 would allow scaling to further increase memory bandwidth, while being transparent to a conventional processor-memory design.

Figure 3B:
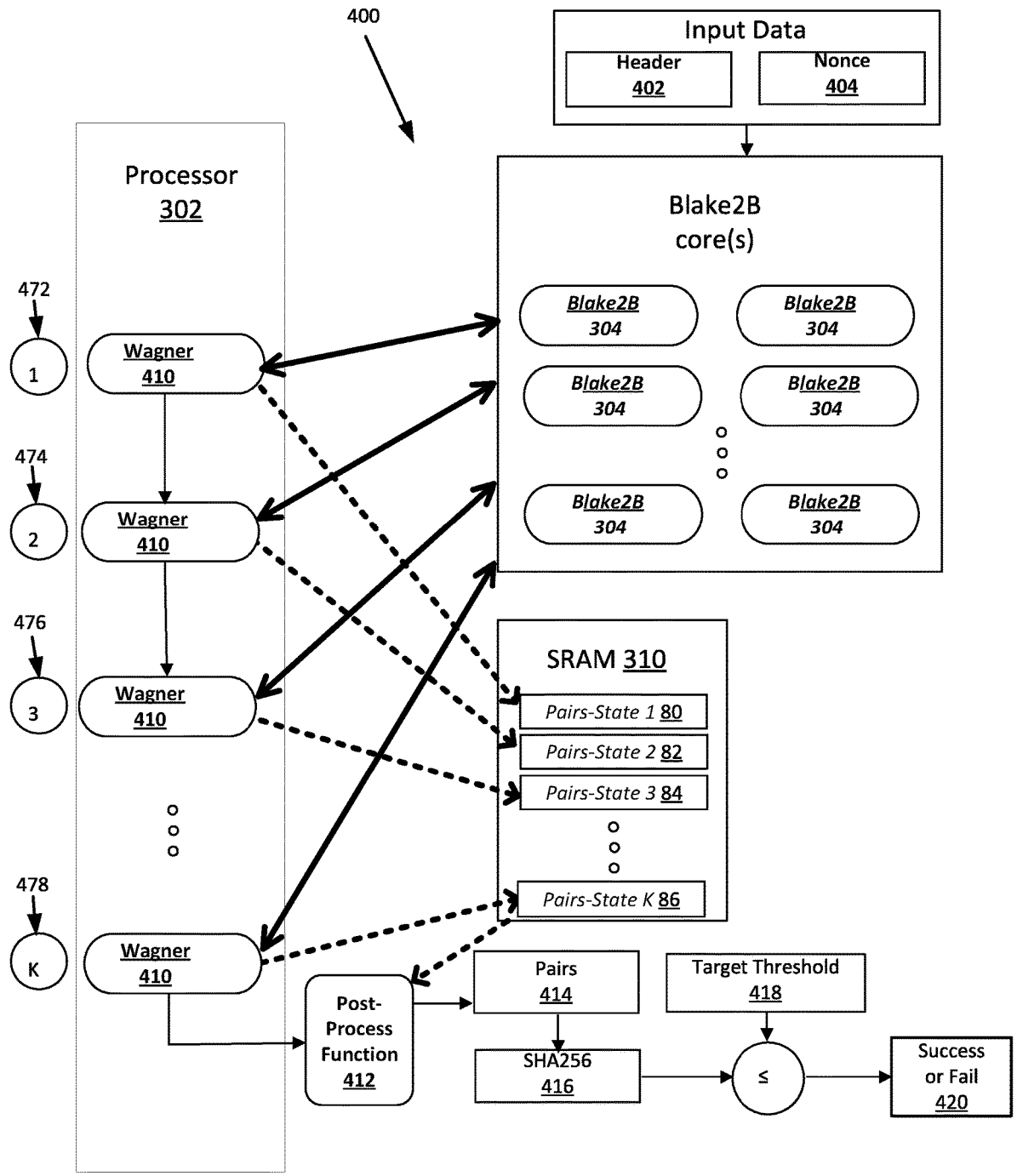
FIG. 3B is a flowchart showing an example method for executing the Equihash algorithm using the circuit of FIG. 3A.

FIG. 3B shows a flowchart 400 of the execution of the Equihash algorithm by the example Equihash ASIC 300 of FIG. 3A, including processor 302. As in the conventional implementation of the Equihash mining algorithm 50, input data in the form of header information 402 and nonce information 404 are received by the Blake2B cores 304, each of which is configured to generate Blake2B hash data 406 on the fly in response to requests from the processor 302. At a first iteration 472 of the Equihash algorithm, the processor 302 executes Wagner's algorithm 410, also as described with regard to FIG. 1B. Unlike in that conventional implementation 50, however, when executed by the Equihash ASIC 300, the execution of Wagner's algorithm 410 execute a call to the Blake2B circuits 304 rather than a memory. The Blake2B circuits 406 generate the necessary Strings/XORwork data (i.e. the header 402 and nonce 404 data hashed by Blake2B to generate $2^{20}$ strings, each string then split in half resulting in $2^{21}$ strings as in the Strings/XORwork-0 array 57, and the resulting XORwork-1 90 through XORwork-(K−1) 95 arrays from FIG. 1B) for each iteration on the fly and supply it to the processor 302 in response to the processor's memory calls. The Pairs data resulting from Wagner's algorithm 410 are stored in the SRAM 310 as a Pairs array for each iteration, i.e. Pairs-State 1 80 through Pairs-State K 86.

As in the conventional implementation of the Equihash mining algorithm 50, this process of executing Wagner's algorithm 410 is repeated a total of K times, starting with the first iteration 472 and ending with the Kth iteration 478. After the Kth iteration 478, a post process function 412 traverses the binary tree stored in SRAM 310 to generate the final Pairs array 414, as in the conventional implementation 50. The Pairs 414 are packed into a solution block as described with respect to the conventional implementation 50 and have a SHA256 hash function 416 applied to them. The hashed solution block is then compared to the target threshold 418, as in the conventional implementation 50. At step 420, the candidate solutions whose hash value is equal to or lower than the target threshold are deemed successful and are propagated to the network; those above the target threshold are deemed invalid and discarded or marked as invalid by the miner's mining pool.

In some implementations, the final steps—post-processing 412, hashing by the SHA256 function 416, comparison to the target threshold 418, and determination of success or failure 420—may be carried out by a separate processor, such as a conventional computer in communication with the network. Each of these steps may also be implemented as a separate specialized circuit of the ASIC 300.

In some implementations, the ASIC 300 may not be able to store more than one solution block at a time. Thus, once one solution block has been stored and a second solution has been identified, the post-processing function 412 may stall execution of Wagner's algorithm 410 for ongoing processes running on the processor 302. The likelihood of finding a third solution is extremely low, so the ASIC may be designed to be able to store only one solution in addition to the solution currently undergoing post-processing.

The Equihash ASIC 300 may avoid wasting processing resources on trivial solutions to the Equihash algorithm. In some examples, the Equihash ASIC 300 does not write strings of all zero bits to memory, so duplicates never get added.

Although the conventional implementation of Equihash 50 and the Equihash ASIC 300 have been described using the example parameter values K=9 and N=200, other parameter values may be used in some example embodiments. Some embodiments may use N=96 and K=5; other example embodiments may use N=210 and K=9. Some embodiments may use the value K=10.

Figure 4:
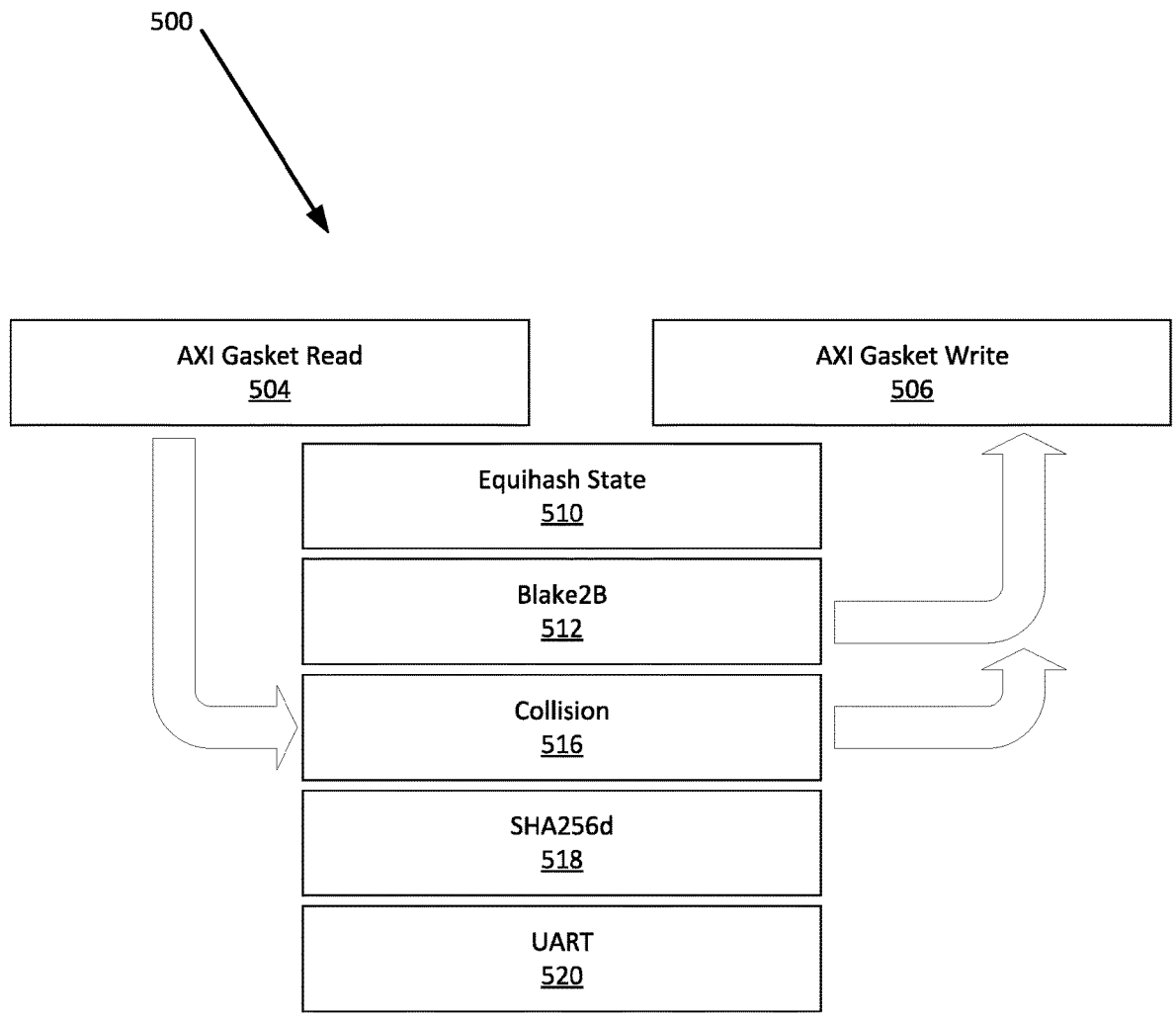
FIG. 4 is a block diagram showing another example circuit for executing the Equihash algorithm without the use of an external memory.

In FIG. 4, a further example Equihash ASIC 500 is shown in block diagram form. It may be implemented in various embodiments as an ASIC or an FPGA. The ASIC 500 contains two clock domains governed by two clocks: a communication clock governs the UART block 520, and a hash clock governs the remaining blocks: the Equihash state block 510, the Blake2B block 512, the Collision block 516, and the SHA256d block 518. The operation of these functional ASIC blocks in these three clock domains is described below.

A Blake2B block 512 acts as a Blake2B circuit 304; in some embodiments, multiple such Blake2B blocks 512 may be used, as further described above, to assist in parallel processing of the Equihash algorithm. The Blake2B block 512 acts to receive input data and generate a Blake2B hash of the input data as an output according to the hash clock; in an example embodiment, it may output Blake2B hash output data every 27 clock cycles. In some examples, the input data may be too long to hash in one pass, requiring one or more 27-cycle passes to generate and output the entire hash output. An example embodiment may use 140 bytes of input data (e.g. header and nonce data) and may require two passes, or 54 clock cycles, to generate the corresponding hash data.

The Universal Asynchronous Receiver-Transmitter (UART) block 520 acts as the interface between the ASIC and a host machine, such as a user's workstation. The ASIC runs on a separate clock domain from the host machine and UART block 520, which are governed by the communication clock, and in some embodiments FIFOs (first-in-first-out memory) are used to cross clock domains between the UART 520 and the rest of the ASIC 500.

The Equihash State block 510 acts as the main state machine of the ASIC 500. It contains all control signals controlling the various blocks. The Equihash State block 510 triggers the start and finish of every sub-block and maintains the state and iteration count as the algorithm progresses.

In an example embodiment, the Equihash State block 510 executes a control flow according to the following sequence:

Wait for UART input (e.g. delivery of header and nonce data)
Generate Blake2B/Strings data (i.e. arrive at State 0)
Start first iteration:
   Start Collision block on Blake2B/Strings data
End first iteration (i.e. arrive at State 1)
Generate Blake2B and XOR data for State 1
Start second iteration:
   Start Collision block on XORwork-1 data
End second iteration (i.e. arrive at State 2)
. . .
. . .
Generate Blake2B and XOR data for State (K−1)
Start Kth iteration:
   Start Collision block on XORwork-(K−1) data
End Kth iteration (i.e. arrive at State K)
Wait for UART output (e.g. identifying valid and invalid nonce values and solutions)

In some embodiments, the Equihash State block 510 contains a pointer sub-block containing the base memory pointers to all the various buffers in memory. This pointer sub-block stores pointers to the Pairs data in SRAM for each iteration. The pointer sub-block recycles buffers as data becomes stale. Various factors may be involved when deciding how to organize memory due to the bit width of the system. Storing data in block sizes that are multiples of the bit width allows for fewer accesses as well less wasted space.

The collision pairs are stored as a binary tree and saved for every iteration, as described with respect to FIG. 1B. Each entry is a node in a binary tree, containing the indices of two children.

The Collision block 516 compares the message of the XORwork and determines if there are collisions. Data is read from the Blake2B block 512, which generates the XORwork data on the fly, and pairs are written out to Pairs Memory (i.e. the pointer sub-block in the Equihash State block 510) for the next iteration of Wagner's algorithm. The Collision block 516 buffers multiple XORwork items in case of multiple collisions, up to a maximum, which is equal to 5 in some embodiments. This value is parameterized and can be increased or decreased at the cost of finding all solutions.

During the final Kth iteration, the complete Pair solution needs to be recovered for outputting to the SHA256d block 518 (described below) or to the UART block 520. This is achieved by recursively reading the search tree until leaf nodes are reached. To preserve ordering, the 64-bit pair data is split into 32-bit addresses and the first half is processed while the second half is pushed into a FILO (first-in-last-out memory) buffer. This FILO buffer is sized to ensure the full tree can be read. While this process is running in parallel, the Collision block 516 continues operation until a second full solution is found, in which case the streaming buffer will be stalled. Since two solutions are expected to be found in a typical execution of the mining algorithm, the odds of this happening are low. There may therefore be no need to support more than one recursive search.

It is important to note that the Pairs data do not require a counter, since they are referenced via a binary tree.

The SHA256d block 518 implements the final stage of the Equihash mining algorithm. It takes the initial input message from the Blake2B block 512, combined with the size of the Pairs and resultant pair list, and runs it through a double SHA256 hash algorithm (or some other variant of the SHA256 hash algorithm). The SHA256d block 518 may in some embodiments be able to buffer multiple solutions, such as up to three solutions, using a lightly pipelined double SHA256 core. A difficulty comparator contained with the SHA256d block 518 checks the SHA256 output, and final values are sent to the UART module if conditions are satisfied, i.e. if the hashed value of the candidate solution is less than or equal to the target threshold.

In some embodiments, the SHA256d block 518 is omitted, with verification of difficulty threshold performed on the host machine. This allows all the pairs of data to be transmitted back to the host, along with the nonce value, for verification as well as difficulty checking.

Although the above-described example Equihash ASICs 300 and 500 of FIGS. 3A-3B and FIG. 4 do not make use of a sort function 58 such as the bucket sort function of FIG. 1B, other embodiments could implement such a sort function, as further described below with respect to FIGS. 5A, 5B, and 6.

In the previously-described ASIC 300, no sorting is used, resulting in $N^2$ comparisons. However, the use of multiple parallel Blake2B cores 304 as described above makes this operation fast despite the slightly larger number of comparisons being performed in the absence of a sort function.

The potential drawback of using a sort function is that it requires the storage of the sorted strings/XORwork data, which typically requires more data storage than SRAM can feasibly provide. Accordingly, it may be necessary to store this sorted data in an external memory. Thus, the potential advantage of eliminating the memory bottleneck may be lost if a sort function is used in an Equihash ASIC. However, such an ASIC using an external memory would still potentially realize power savings relative to the conventional implementation of Equihash 50.

Figure 5A:
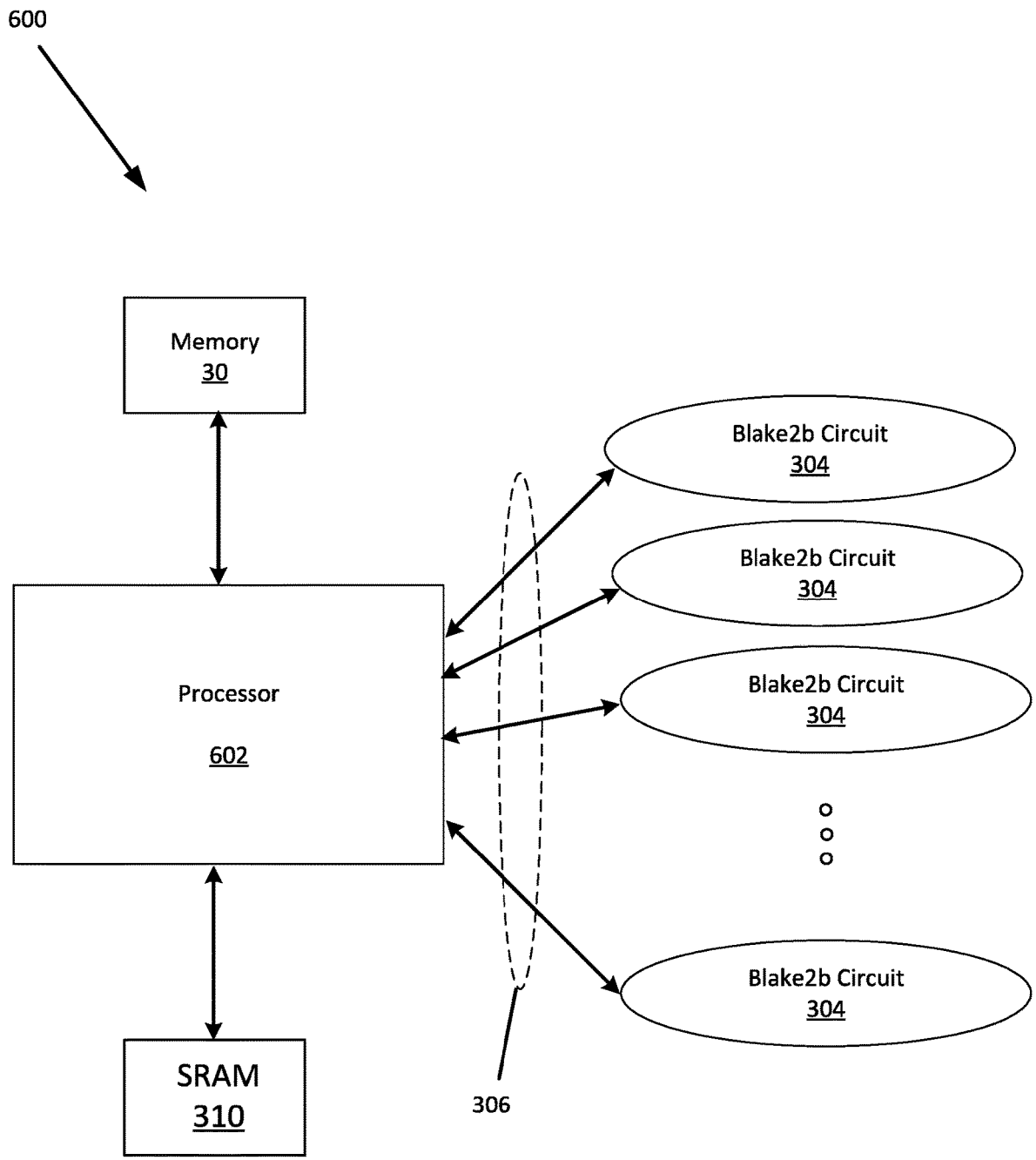
FIG. 5A is a block diagram showing an example circuit for executing the Equihash algorithm using an external memory.

FIG. 5A shows an alternative embodiment of an Equihash ASIC 600. This ASIC 600 uses an external memory 30, as in the conventional Equihash implementation 50. This memory 30 may be used in various embodiments to store the Blake 2B data, Strings data, XOR data, and/or sorted XOR data. The processor 602 is configured to carry out any sorting operations or memory reads and writes that become necessary due to the presence of the external memory 30 and/or the use of a sorting algorithm. Otherwise, the ASIC 600 is essentially similar to the Equihash ASIC 300 of FIG. 3A.

Figure 5B:
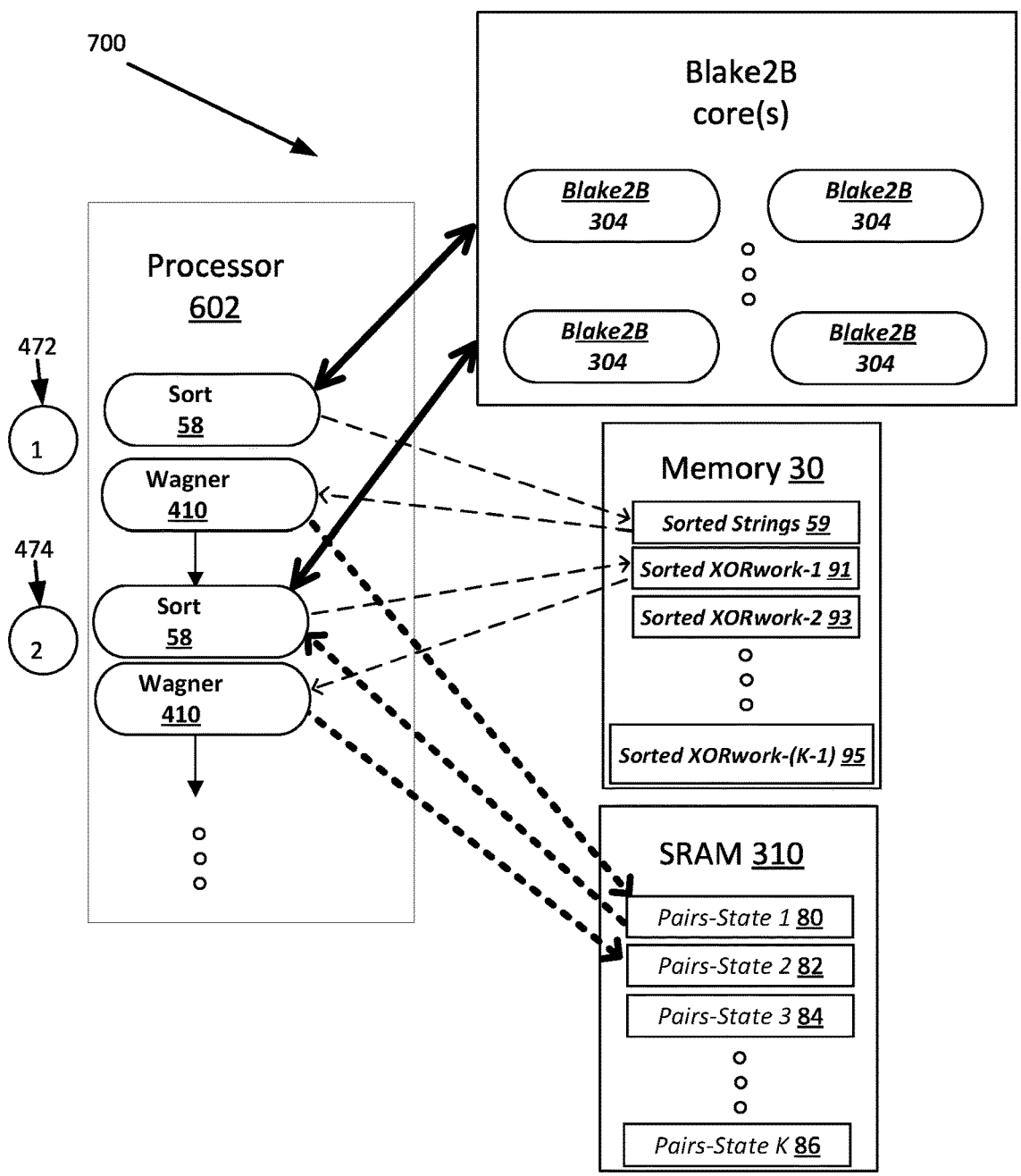
FIG. 5B is a flowchart showing an example method for executing the Equihash algorithm using the circuit of FIG. 5A.

FIG. 5B shows a simplified flowchart 700 of iteration 1 472 and iteration 2 474 of the Equihash mining algorithm as executed by the alternative Equihash ASIC 600. In this alternative flowchart 700, each iteration involves execution by the processor 602 of a sorting step 58 as in the conventional implementation 50. At the first iteration 472, the sorting step 58 prompts the generation of Blake2B and Strings data by the Blake2B cores 304. The Strings data is sorted by the sorting algorithm 58 running on the processor 602, and the sorted Strings data is stored in the external memory 30 in the Sorted Strings array 59. The processor 602 then executed Wagner's algorithm 410 using the stored Sorted Strings 59 data as its input. Wagner's algorithm 410 generates Pairs data, which is stored in SRAM 310 in the Pairs-State 1 80 array.

The second iteration 474 proceeds likewise: the sorting step 58 prompts the Blake2B cores 304 to generate the Blake2B and Strings data, and to perform the XOR operations for State 1 to generate XORwork-1. The XORwork-1 data is sorted by the sorting algorithm 58 running on the processor 602, and the sorted XORwork-1 data is stored in the external memory 30 in the Sorted XORwork-1 array 91. The processor 602 then executed Wagner's algorithm 410 using the stored Sorted XORwork-1 array 91 data as its input. Wagner's algorithm 410 generates Pairs data, which is stored in SRAM 310 in the Pairs-State 2 82 array.

Subsequent steps proceed in the same fashion, with the results as described above with regard to flowchart 400 for the Equihash ASIC 300.

Figure 6:
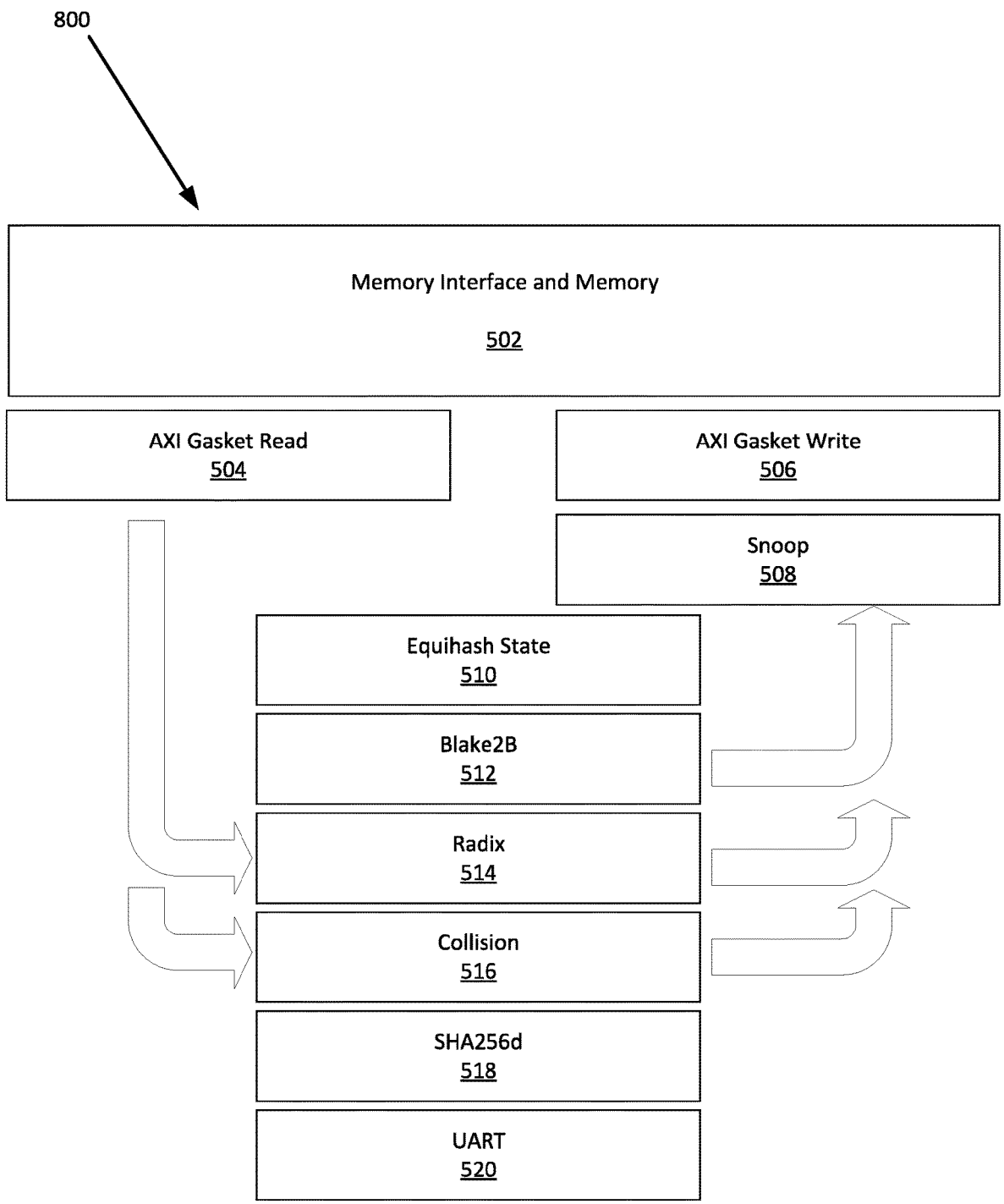
FIG. 6 is a block diagram showing another example circuit for executing the Equihash algorithm using an external memory.

FIG. 6 shows a further block diagram of an alternative Equihash ASIC 800. It is similar to the ASIC 500 of FIG. 4, except that it uses and external memory and a radix sort algorithm. The differences between this ASIC 800 and the memory-less Equihash ASIC 500 are described below.

This ASIC 800 has a memory interface and memory block 502. For accessing an external memory. It uses a third clock—a memory clock—to define a third clock domain and governs the memory interface and memory block 502.

The ASIC 800 also has an AXI (Advanced eXtensible Interface) Gasket Read block 504 and an AXI Gasket Write block 506 in the illustrated embodiment. In some embodiments, these serve as a memory interface for all blocks, utilizing an RTS/RTR (request to send/ready to receive) protocol to send and receive data to and from memory using the AXI Gasket Write block 506 and the AXI Gasket Read block 504 respectively.

In some embodiments, the write interface of the AXI Gasket Write block 506 is simpler than the read interface of the AXI Gasket Read block 504: once the data has been sent out, there is no need to wait for any return. The memory controller of the memory interface and memory block 502 ensures coherency such that data is written into the memory before subsequent reads are executed. The AXI interface will continue accepting memory writes until the memory controller is saturated.

The read interface of the AXI Gasket Read block 504 requires data to be returned after an address request, thus requiring more logic in some embodiments. Only one read request can be accepted at a time, which is inefficient. Therefore AXI burst may be supported in some embodiment so that one request can return multiple data. Tagging may also be supported in some embodiments, allowing out of order read returns to occur.

The AXI Gasket Write block 506 and AXI Gasket Read block 504 are governed by the hash clock.

In some embodiments, the ASIC 800 handles the Blake2B data differently from ASIC 500 insofar as it makes use of the external memory. After the hash data output from the Blake2B block 512 is split (i.e. each 2N-bit hash data output string is split into two N-bit length strings), it is written to a current Intermediate Memory space dictated by the Equihash State block 510 using the index as its address.

Furthermore, when the Blake2B block 512 generates output data, it also sends a signal to the snoop block 508 (described below) to assist with sorting.

The memory interface and memory block 502 is governed by the memory clock. In some examples it may include a memory controller. Depending on the data width and bank configuration of the memory used by the ASIC 500, multiple controllers may be used to increase bandwidth.

The memory interface and memory block 502 also contains memory, such as conventional DDR memory (ranging from DDR to DDR4) or HBM (high bandwidth memory). The memory interface or memory controller is used to access this memory for read and write operations.

The memory interface and memory block 502, and thus the memory controller, may run at a different speed from the hash clock. In some embodiments, it will run at 4 times the rate of the hash clock. In some examples this higher clock speed may allow a 256-bit interface for memory accesses. In some embodiment, reading and writing to the Pairs binary trees will require 64-bit accesses, so the memory bus will be qword enabled.

The snoop block 508 is a parameterized module containing counters to determine the bucket sizes for sorting. By marking every write of message data to memory (including initial Blake2B data), the snoop block will increment counters until a stage has finished. The resulting counters will be used to divide buckets in memory for a radix sort algorithm. Two sets of counters may be used in some embodiments, being alternately used for the current-stage and next-stage buckets. The snoop block 508 in different examples may vary the number of buckets used in the radix sort algorithm and the size of the counter used (which is based on the value of $2^{(N/(K+1))+1}$, or $2^{21}=2,097,152$ in examples where N=200 and K=9).

The message sent from the Blake2B block 512 when it outputs hash data triggers the snoop block 508 to increase its counters, allowing the sorting algorithm to position data efficiently without dynamic allocation of memory.

In an example embodiment, the Equihash State block 510 executes a control flow according to the following sequence:
  Wait for UART input (e.g. delivery of header and nonce data)
  Generate Blake2B data (i.e. arrive at State 0)
  Start first iteration:
    Start Radix Sort block
    Store sorted data in memory
    Start Collision block
    Store matching Pairs data in pointer sub-block in Equihash State block 510
  End first iteration (i.e. arrive at State 1)
  Start second iteration:
    Start Radix Sort block
    Store sorted data in memory
    Start Collision block Store matching Pairs data in pointer sub-block in Equihash State block 510
End second iteration (i.e. arrive at State 2)
. . .
. . .
Start Kth iteration:
  Start Radix Sort block
  Store sorted data in memory
  Start Collision block
    Store matching Pairs data in pointer sub-block in Equihash State block 510
  End Kth iteration (i.e. arrive at State K)
Wait for UART output (e.g. identifying valid and invalid nonce values and solutions)

In this ASIC 800, the initial dataset generated by the Blake2B block 512 is kept in memory for verification purposes and also used as the leaf nodes of the binary tree. The data generated by this block is roughly 256 MB in some embodiments, and thus this determines the buffer size for all the remaining buffers.

An Intermediate Memory managed by the Equihash State block 510 contains the XORwork array for each iteration or state. As described above with respect to FIG. 1B, the XORwork data can be discarded as the data becomes stale. In some embodiments, the data is prepended with the Strings index or Pairs pointer when written to memory.

There are 2 Intermediate Memory spaces, one for current work and one for next work. Current work gets discarded and next work becomes current as the iterations progress. In some embodiments, data that overflows these memories are discarded as well, thus leaving a small possibility of missed solutions.

Due to sorting, when Intermediate Memory is sorted to find collisions, a pointer to the pairs used to generate the work must be stored as well. In some embodiments, all spaces are accessed in 256-bit addresses while the memory pointers stored in the Pairs arrays are addressed on a 64-bit basis due to the compacting of two 32-bit memory addresses.

As with ASIC 500, in this ASIC 800 the collision pairs are stored as a binary tree and saved for every iteration, as above. However, since the initial Blake2B-generated dataset is stored in memory throughout the execution of the mining algorithm in this ASIC 800, leaf nodes can be found by checking the address is in the Blake Memory space.

The Radix Sort block 514 reads the current-work Intermediate Memory containing the original Blake2B data or XORwork data. The data is then written back into the corresponding buckets based on the bucket counters and iterated, depending on the block parameters.

The message size is indicated by d, where d=N/(K+1), or d=20 where N=200 and K=9. This message size is divided into buckets depending on the desired number of iterations through the $2^{(N/(K+1))+1}$ (2,097,152 for K=9,N=200) elements. Smaller number of buckets require more passes through memory, so varying these parameters may have a direct impact on performance. In an example embodiment where N=210 and K=9, the message size of 21 bits can be sorted with 8 buckets and 7 passes or 128 buckets and 3 passes.

As in ASIC 500, the Collision block 516 compares the message of the XORwork and determine if there are collisions. However, in this ASIC 800, the XORwork data is read from the sorted current-work Intermediate Memory and pairs are written out to Pairs Memory for the next iteration of Wagner's algorithm. The resultant XORwork is written out to the next-work Intermediate Memory.

A streaming buffer (which may in some embodiments be a FIFO) is used for the input to the Collision block 516 and is controlled with a watermark, always allowing for the collision logic to have work. When the buffer is depleted below the watermark, the buffer is filled, ensuring that it is never empty. Sizing of this buffer may be configurable and is generally set with a depth sufficient to balance out memory read latency. With the additional use of AXI burst reads and with a known memory latency, a user may in some embodiments be able to specify the streaming buffer depth to ensure that input is always available to the Collision block 516.

When collisions are detected by the Collision block 516, the matching Pairs and their resultant XOR data is written back to memory in preparation for the next iteration. As a higher number of data elements collide, the streaming buffer reads are stalled to allow for adequate cycles to write out into memory.

It is important to note that the Pairs data do not require a counter, since they are referenced via a binary tree. In contrast, the Intermediate Memory is sorted, so the size must be known.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an embedded processor, a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An application-specific integrated circuit (ASIC) for executing an Ethash algorithm requiring reading directed acyclic graph (DAG) data, comprising:

a processor configured to:
  process a header and a nonce value to generate a mix value; and
  generate a request for a DAG data page of the DAG data, the DAG data page being identified based on the mix value; and
at least one Secure Hash Algorithm 3 (SHA3) core configured to:
  receive the request from the processor;
  process the header and the nonce value to generate a first portion of the DAG data, without accessing data stored in a memory prior to receiving the request, the first portion of the DAG data including the DAG data page identified by the request; and
  return the DAG data page to the processor.

2. The ASIC of claim 1, wherein the at least one SHA3 core is configured to execute the SHA3-256 hash function, the Fowler-Noll-Vo (FNV) hash function, and the RandMemoHash hash function to generate the first portion of the DAG data.

3. The ASIC of claim 1, wherein the at least one SHA3 core comprises a plurality of SHA3 cores operating in parallel.

4. The ASIC of claim 3, wherein the processor is configured to execute multiple processes of the Ethash algorithm in parallel.

5. The ASIC of claim 4, wherein the processor comprises multiple processing cores.

6. A method of executing an Ethash algorithm requiring reading directed acyclic graph (DAG) data, comprising:
  processing a header and a nonce value, at a state machine of an ASIC, to generate a mix value; and
  generating, at the state machine, a request for a DAG data page of the DAG data, the DAG data page being identified based on the mix value;
  receiving, at a Secure Hash Algorithm 3 (SHA3) core of the ASIC, the request from the state machine;
  processing, at the SHA3 core, the header and the nonce value to generate a first portion of the DAG data, without accessing data stored in a memory prior to receiving the request, the first portion of the DAG data including the DAG data page identified by the request; and
  returning the DAG data page to the state machine.

7. The method of claim 6, wherein processing, at the SHA3 core, the header and the nonce value comprises:
  executing the SHA3-256 hash function, the Fowler-Noll-Vo (FNV) hash function, and the RandMemoHash hash function to generate the first portion of the DAG data.

8. The method of claim 6, further comprising:
  executing, at the state machine, multiple solution attempts of the Ethash algorithm in parallel; and
  using a separate respective SHA3 core for each respective solution attempt of the Ethash algorithm to perform the steps of:
    receiving a respective request from the state machine;
    processing the header and a respective nonce value to generate a respective first portion of the DAG data, without accessing data stored in a memory prior to receiving the request, the respective first portion of the DAG data including a respective DAG data page identified by the respective request; and
    returning the respective DAG data page to the state machine.

9. The method of claim 8, wherein the state machine comprises multiple processing cores.

* * * * *